March 1, 1966  A. McMILLAN  3,237,925

MIXING MACHINE

Original Filed May 14, 1962  6 Sheets-Sheet 1

INVENTOR.
ANDREW McMILLAN

March 1, 1966  A. McMILLAN  3,237,925
MIXING MACHINE
Original Filed May 14, 1962  6 Sheets-Sheet 3

FIG. 5.

INVENTOR.
ANDREW McMILLAN

INVENTOR.
ANDREW McMILLAN

INVENTOR.
ANDREW McMILLAN

INVENTOR.
ANDREW McMILLAN

United States Patent Office 3,237,925
Patented Mar. 1, 1966

3,237,925
MIXING MACHINE
Andrew McMillan, Milwaukee, Wis., assignor to Rex Chainbelt Inc., a corporation of Wisconsin
Original application May 14, 1962, Ser. No. 194,377. Divided and this application Aug. 23, 1965, Ser. No. 481,694
7 Claims. (Cl. 259—169)

This application is a division of application Serial No. 194,377, filed by the inventor on May 14, 1962, entitled "Mixing Machine."

This invention relates, generally, to agitating apparatus and more particularly to mixing machines of the pan type adapted for mixing the ingredients of concrete and the like.

Mixing machines of this general description have been used for many years to mix a great variety of materials and have been made in many different forms. Some mixers of this type utilize gyrating mixing blades, some have rotating pans, and others employ both of these expedients or other equally complicated and cumbersome combinations of apparatus.

A simple and sturdy form of pan mixer uses a stationary circular pan that cooperates with a central rotating member carrying the mixing blades. The fixed mixing pan ordinarily has an upstanding cylindrical outer wall and may also have a cylindrical inner wall forming with the outer wall an annular trough constituting the mixing chamber through which the mixing blades circulate.

A controlled opening for discharging the mixed material is required in the mixing pan and this has in the past presented difficulties with regard to excessive leakage during mixing and to the proper regulation of the outflowing material during discharging. Furthermore, the conventional regulating doors used heretofore for closing the discharge openings have been generally unsatisfactory and difficult to operate. Also it has been troublesome to maintain them in good working order and they have taken up more space than was desirable.

It is therefore a general object of the present invention to provide an improved mixer of the pan type that is of increased capacity and of generally rugged and trouble-free construction.

Another object of the invention is to provide an improved mixer that is capable of rapid and thorough mixing of the ingredients of concrete and like granular and adhesive materials.

Another object of the invention is to provide an improved mixer that is adapted to discharge mixed materials rapidly at a selected readily controlled rate of flow.

Another object is to provide a pan mixer having an improved discharge door that operates readily to meter the flow of discharging material and that closes tightly to minimize leakage.

A more specific object is to provide an improved discharge door for a pan mixer that is especially adapted to operate with minimum leakage of liquid material when closed and that is capable for continuing to operate over a relatively long period of time without any material increase in the rate of leakage.

According to this invention, an improved mixing machine of the pan type having an annular mixing chamber is provided with novel features that facilitate the mixing of low slump concrete and the like and that insure continued operation with a minimum of trouble and expense. The pan of the improved mixer is suspended from a horizontal frame that carries a driving motor connected to a novel driving mechanism which drives the mixing blades. The driving mechanism includes a speed reducing gear system in a housing that is fixed in the frame and that has rotatably mounted on its lower end a mixing rotor that carries mixing blades in cooperating relationship with the mixing pan. The mixing blades are mounted on resilient arms by means of pins that may be driven out readily to remove the blades even though covered with accumulated concrete. Each arm carries a lower blade operating near the bottom of the pan and an upper blade disposed above and ahead of the corresponding lower blade. During mixing the upper blades urge the material outwardly while the lower blades urge it inwardly thereby establishing a circular motion causing the material to flow in a generally helical toroidal path about the annular mixing chamber. Mixing water is introduced through a nozzle that directs it onto the mixing rotor for distribution into the batch. An auxiliary nozzle directs additional water onto the material that lies under and is shielded by the rotor. For discharging the mixed concrete, an improved discharge opening in the shape of an isosceles trapezoid is provided in the floor of the pan with its narrow end downstream of the mixing direction. A door of complementary shape is mounted for endwise sliding movement beneath the floor at a slight inclination such that its narrow end closes flush with the narrow end of the opening and its sides wedge against the tapering sides. Grout collecting on the inclined door seals it to prevent leakage. The door is operated by hydraulic power means which serves to withdraw it endwise beneath the upstream end of the opening, the amount of movement being controlled to regulate the degree of opening and the rate of discharge. Because of the wedging closure, the door operates without jamming or binding and with very little wear along its sealing edges. To facilitate renewal of blades and other wearing parts, the mixing pan is suspended from the frame by long bolts that are arranged to operate as jack screws for lowering the pan below the level of the blades.

The foregoing and other objects of this invention will become more fully apparent upon perusing the following detailed explanation thereof in conjunction with the accompanying drawings illustrative of improved mixing apparatus constituting the presently preferred embodiment of the invention wherein.

The particular mixing machine shown in the drawing as embodying features illustrative of the present invention is of the fixed annular pan type and is herein described as being especially adapted for mixing the ingredients of concrete, although it is to be understood that it may be used to advantage in the mixing of various other materials as well. The illustrated mixing machine herein set forth constitutes the best mode contemplated of carrying out the invention.

Figures 1, 2:
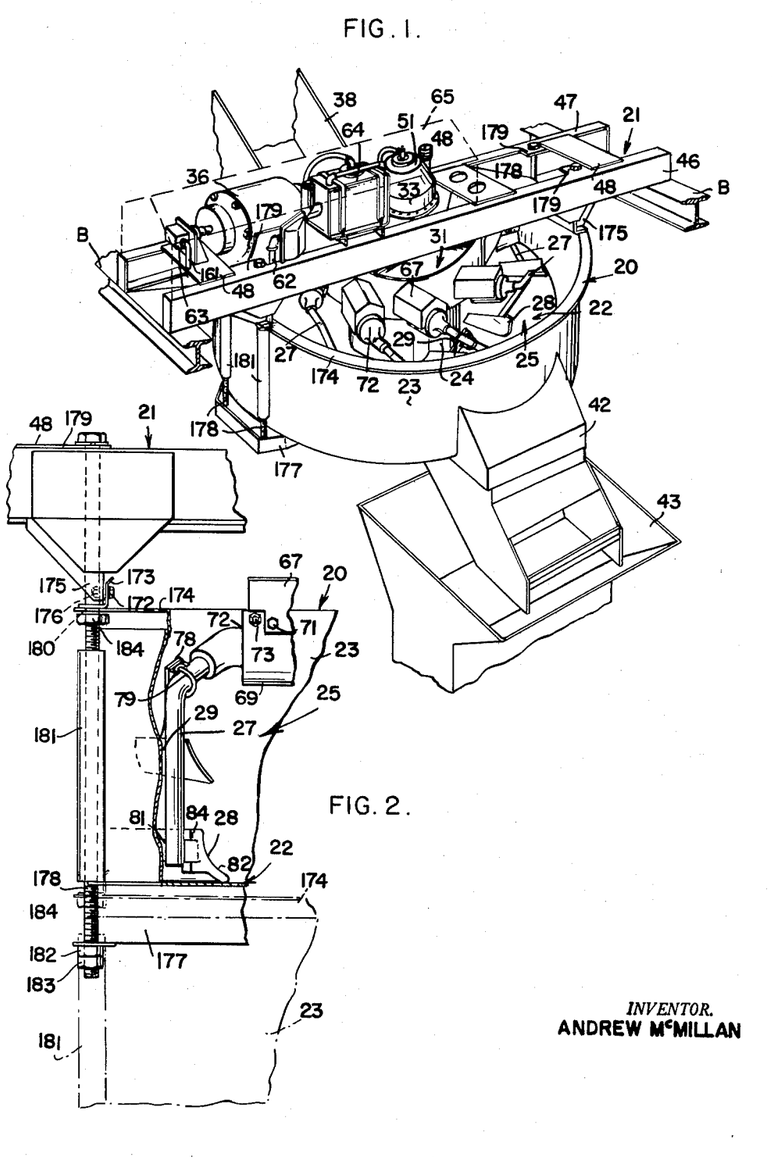
FIGURE 1 is a view in perspective of a mixing machine of the fixed annular pan type embodying the novel features of the invention.
FIG. 2 is an enlarged fragmentary view in elevation of parts of the left end of the machine shown in FIGURE 1 and illustrating the manner in which the mixing pan may be lowered to provide access to the interior.
Figure 3:
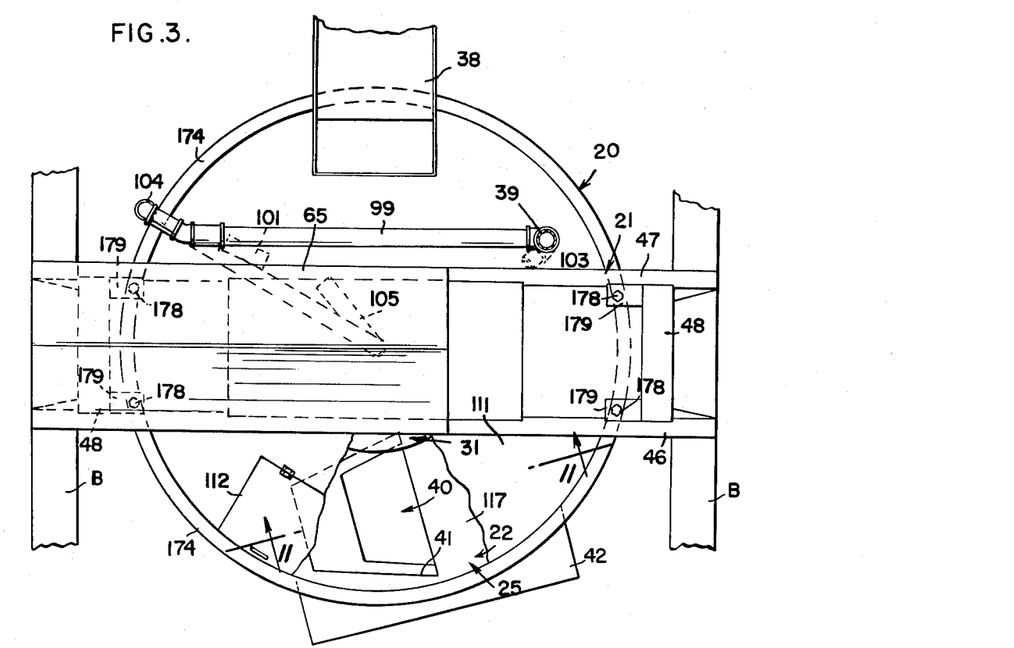
FIG. 3 is a plan view of the mixing machine illustrated in FIGURE 1 with parts broken away to show the discharge opening and cooperating door.
Figure 4:
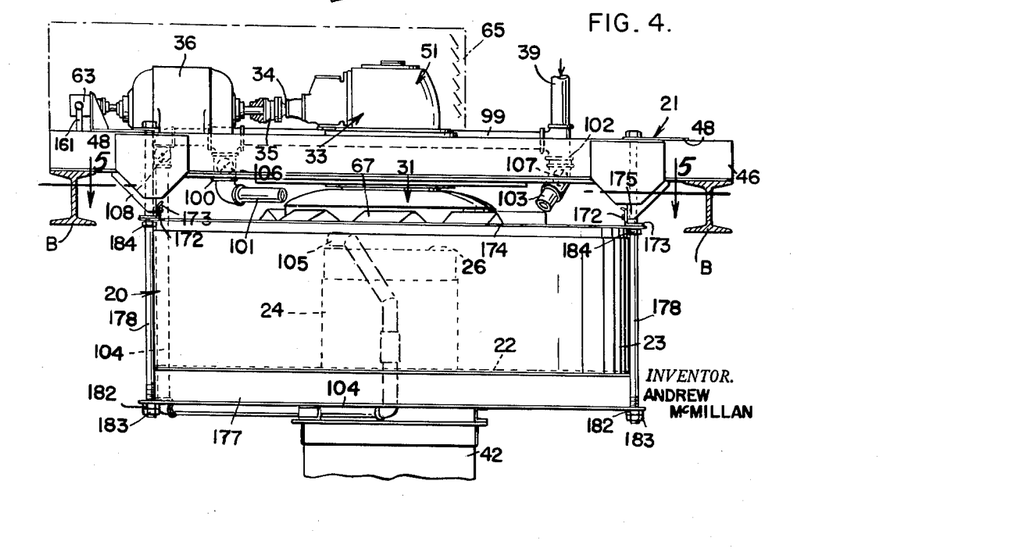
FIG. 4 is a view in side elevation of the mixing machine shown in FIG. 3.

Referring now more specifically to the drawing and particularly to FIGS. 1, 3 and 4 thereof, the pan mixing machine there shown generally by way of illustration comprises essentially a stationary circular mixing pan 20 that is suspended from a main frame 21 extending horizontally above it. As shown in the drawing, the main frame 21 is suported at its respective ends upon suitable abutments such as transverse beams B that may in this instance represent elements of the framework of a structure such as a mixing plane housing the mixer and its asociated equipment.

The mixing pan or drum 20 has a flat horizontally disposed circular floor 22 joined at its periphery to an upstanding cylindrical outer wall 23. An inner cylindrical wall 24 of generally similar height is spaced inwardly from the outer wall 23 in a manner to define between them an annular trough forming a mixing chamber 25 of generally rectangular section for receiving ingredients to be mixed. The inner wall 24 encircles a central cylindrical opening 26 of substantial diameter extending vertically through the pan. In the particular mixer illustrated, the annular mixing chamber 25 is of relatively large capacity and deeper than usual, being capable of mixing in excess of four cubic yards of concrete at a time. The machine, however, may be made in various other sizes either larger or smaller as desired.

Mixing arms 27 carrying lower mixing blades 28 and upper mixing blades 29 extend into the mixing chamber 25 outwardly and downwardly from a central mixing rotor 31. The rotor 31 is arranged concentric with the vertical axis of the pan 20 and is mounted for rotation upon the lower end of a vertically disposed stationary cylindrical cannon element 32 that projects downward from a speed reducing power transmission mechanism 33 carried by the horizontal main frame 21. A driven input shaft 34 extending horizontally from the transmission mechanism 33 is connected by a coupling 35 to a driving motor or power source which in this instance is an electric motor 36 also mounted on the main frame 21 and disposed longitudinally thereof.

The dry ingredients of the concrete being mixed are fed into the mixing chamber 25 through a charging chute 38 in proper proportions in accordance with well known practice. Water constituting the liquid ingredient is introduced through water supply piping 39 in the required amount to complete the batch. The rotor 31 and attached blades 28 and 29 are rotated by the motor 36 to distribute the ingredients as they are fed into the chamber 25 and continue rotating to mix them. When the ingredients are sufficiently mixed, a door 40 closing a discharge opening 41 in the floor 22 of the pan 20 is opened to discharge the mixed material through a discharge chute 42. The chute 42 if desired may discharge into a holding hopper 43 in order to store one mixed batch so that a delivery vehicle, such as a truck mixer or the like, may be loaded expeditiously with say eight cubic yards of concrete, four yards from the holding hopper 43 followed by four more yards discharged directly from the mixing chamber 25 through the chute 42 and the hopper 43.

Considering the structure of the improved mixer now more in detail, the main supporting frame 21 comprises a pair of spaced transverse beams 46 and 47 that are in this instance preferably box section beams formed by channel members closed by flat plates. The spaced beams 46 and 47 rest at their ends upon the supporting structural beams B that are shown as being in the form of I-beams. As best shown in FIGS. 3 and 4, the transverse box beams 46 and 47 are joined in spaced relationship by a plurality of cross members 48 to form a bridge that constitutes the support for the driving mechanism as well as for the suspended mixing pan 20.

Figure 6:
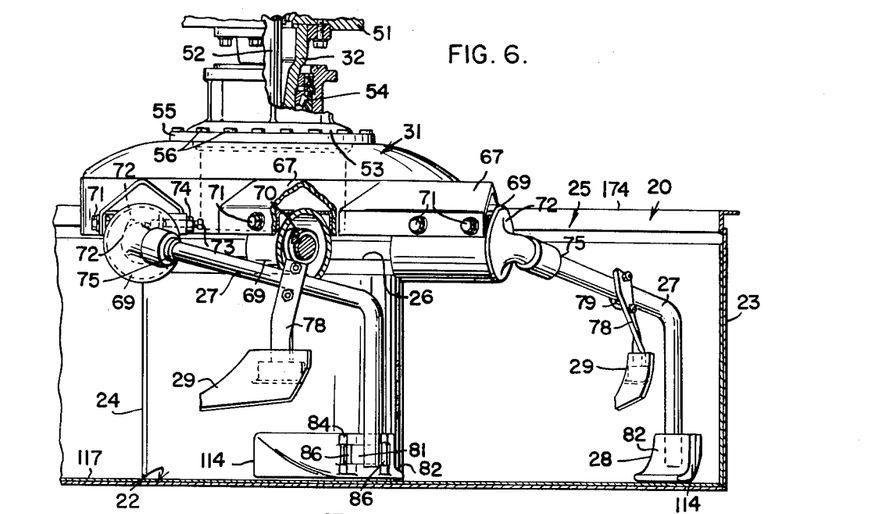
FIG. 6 is an enlarged fragmentary view partly in elevation and partly in vertical section of the right hand portion of the mixing machine as shown in FIG. 4 illustrating the arrangement of the mixing blades and showing part of the drive mechanism.

The speed reducing power transmission mechanism 33 is contained with a generally round casing or housing 51 that fits between and is firmly secured to the spaced beams 46 and 47 and to the cross members 48 in manner to constitute in effect an integral central part of the main frame bridge structure. As best shown in FIG. 6, the previously mentioned vertically disposed depending cannon element 32 is secured at its upper end to the lower side of the transmission housing 51 concentric with the circular pan 20 and centrally of the frame 21, the arrangement being such that the cannon is supported rigidly by the main frame in manner to resist the forces imposed upon it as the result of rotating the rotor 31 in moving the directly-connected mixing blades 28 and 29 through the ingredients in the mixing chamber 25.

Within the central housing 51, the power transmission mechanism 33 comprises direction changing and speed reducing gearing (not shown) preferably of the well-known hypoid gear type, that is driven by the horizontal input shaft 34 and that is operatively connected to drive a vertically disposed output shaft 52 at reduced speed. As best shown in FIG. 6, the vertical output shaft 52 extends down through and is journalled within the depending cylindrical cannon element 32 that carries the mixing rotor 31. The lower end of the vertical shaft 52 extends into a cylindrical hub or housing 53 that is journalled on the lower end of the cannon 32 by means of anti-friction bearings 54. The hub 53 extends downward within the center of the mixing rotor 31 and is provided with a central flange 55 that is secured to the top of the rotor 31 by cap screws 56. Housed within the cylindrical hub 53 at the lower end of the cannon 32 is a speed reducing power transmission mechanism (not shown) preferably of the well-known planetary type, that is connected to the lower end of the vertical shaft 52 in manner to be driven thereby and that is operatively connected to drive the hub 53 at reduced speed by turning it on the bearings 54.

The two speed reducing mechanisms interposed between the driving motor 36 and the mixing rotor 31 are so designed that the rotor is turned at an appropriate mixing speed whereby the outermost mixing blades move through the material being mixed at an optimum maximum peripheral speed of about six hundred and twenty-five feet per minute. This requires that the mixing rotor 31 be turned at the slow speed of about nineteen revolutions per minute and to accomplish this the speed reducing mechanisms operate to reduce the speed from about seventeen hundred and sixty revolutions per minute at the input shaft 34 which is driven directly by the motor 36.

The motor 36 is mounted upon cross members 48 of the frame 21 and is furnished with electrical energy through an electrical conduit 62 from the usual transmission line and motor control apparatus (not shown). By reason of being mounted on top of the frame 21, the motor 36 is readily accessible and is exposed for better cooling. At its end opposite from the coupling 35 that connects with the horizontal shaft 34, the motor 36 is operatively connected to a pump 63 which it drives to pump hydraulic fluid from a reservoir 64 also mounted on the frame 21 for operating the discharge door 40 hydraulically. A hood or housing 65 is fitted over the motor 36 and the transmission mechanism 33 and is slidably mounted on the frame 21. To gain access to the motor 36, the housing 65 may be slid endwise on the frame 21 to the right as shown in FIG. 4 or it may be removed entirely if more room is required.

The central mixing rotor 31 that is rotatably mounted on the lower end of the depending vertically disposed cannon 32 is of circular dome shape somewhat larger in diameter than the cylindrical inner wall 24. The rotor 31 is positioned just above and overhangs the inner wall 24 forming a hood over the central opening 26 that is defined by the wall 24 in the center of the pan 20. As may best be seen in FIG. 5, the mixing rotor 31 is provided on its periphery with a series of integrally formed outwardly projecting mixer blade carrying brackets 67, in this particular instance eight brackets variously spaced angularly about the rotor. As shown, the several brackets 67 are inclined rearwardly with reference to the direction of rotation or mixing direction that is indicated by the arrow 68 as being clockwise in this instance, the angle of inclination of the brackets being about thirty-five degrees relative to a radius of the rotor.

Each of the blade carrying brackets 67 is rooflike in shape and so constructed that it serves to sustain the impact of and to divert any large aggregates intermingled in the ingredients that may strike upon the brackets when being charged into the mixing chamber 25 through the charging chute 38. Furthermore, the extending brackets 67 are of sufficient strength and sturdiness to withstand the forces arising when turning the mixing blades through the ingredients being mixed and particularly the high forces that may arise in restarting the mixing operation should the mixer stop with the blades buried in the mass of ingredients.

Figures 7, 8, 9, 10:
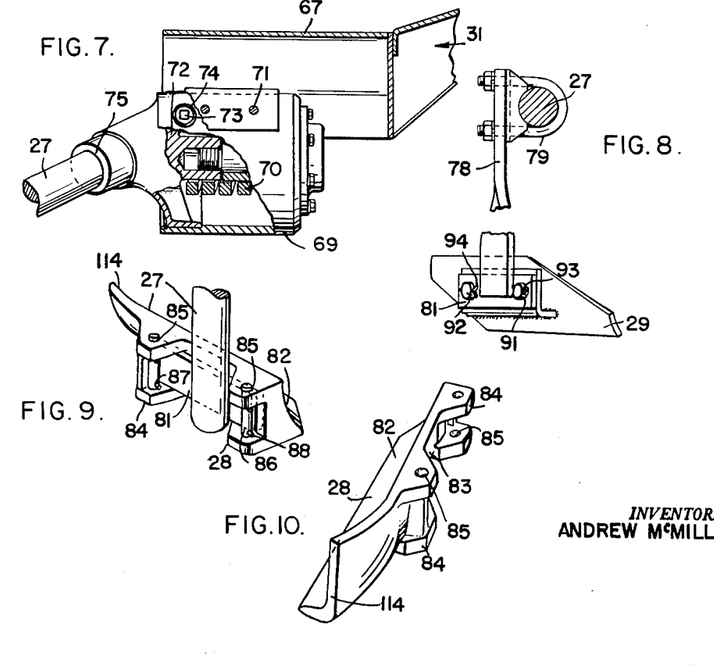
FIG. 7 is an enlarged detailed view partly in section, of one of the mixing arm supporting brackets showing the resilient mountings.
FIG. 8 is a detailed view partly broken away showing one of the upper mixing blades.
FIG. 9 is a detailed view in perspective of one of the lower mixing blades showing the improved attaching arrangement.
FIG. 10 is another view in perspective of the blade shown in FIG. 9 taken from a different angle.

As best shown in FIGS. 6 and 7, each blade carrying bracket 67 overlies and supports a cylindrical housing 69 containing a heavy, rugged helical spring 70 that forms the resilient mounting for the associated blade arm 27. The cylindrical housing 69 fits beneath the roof-like bracket 67 and is secured to it by bolts 71. The coiled torsion spring 70 abuts at its inner end against a projection on the closed inner end or head of the cylindrical housing 69. The outer end of the spring 70 abuts against a lug on the inner side of a hub 72 that is journalled in the outer end of the cylindrical housing 69. After the spring 70 has been tightened, the hub 72 is held in position by an adjusting screw 73 secured by a lock nut 74 and that engages a lug on the inner side of the hub 72 for turning it to adjust the position of the mixing blades.

The outer side of each hub 72 is provided with a socket 74 that is angularly positioned to receive one end of one of the mixing arms 27 that carry the mixing blades. As shown, each mixing arm 27 is constituted by a round bar preferably of steel that is bent to support the blades in the desired position relative to the pan 20. A straight end portion of each arm 27 is received within the socket 74 of the spring pressed hub 72 in the corresponding spring housing 69. From the straight end portion received in the socket 75 each arm is bent rearwardly and then bent downwardly, the arrangement being such that when the torsion spring 70 is properly adjusted by the adjusting screw 73 it normally holds the lower end of the arm 27 and the lower blade 28 thereon is closely spaced working relationship with the floor 22 of the pan 20. Should the blade 28, however, encounter an obstruction, such as a stone that might wedge under it, the torsion spring 70 will permit the blade and its arm to lift sufficiently to pass over the obstruction and then will return the blade to its normal adjusted working position. By reason of the rearward inclination of the blade carrying brackets 67, upward movement of each outermost lower blade 28 occurs along an arc leading inwardly away from the outer wall 23 thereby avoiding contact with the wall.

Figure 5:
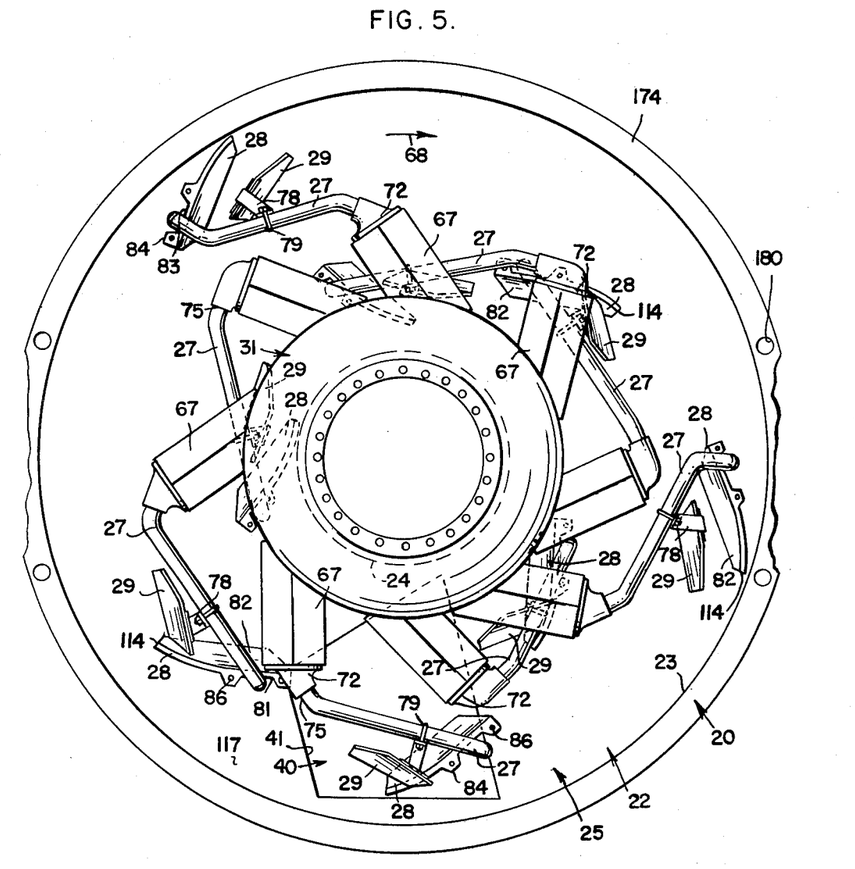
FIG. 5 is a view in horizontal section through the machine, taken on the plane represented by the line 5—5 in FIG. 4 and showing the arrangement of the mixing blades within the pan.

As indicated in FIG. 6 of the drawing, the lower mixing blades 28 on the lower ends of the several mixing arms 27 all are adjusted as explained to operate as close to the floor 22 as practicable without actually contacting the pan. As shown in FIG. 5, the several arms 27 are bent differently in order that the blades 28 may follow different paths in circulating about the mixing pan 20. The various blade arms 27 are in that way arranged to position the blades for best mixing action in moving through the ingredients being mixed. At the same time they are so mounted that the forces exerted upon the blades during mixing are balanced against each other in manner to avoid excessive lateral forces upon the mixing rotor 31 and its supporting structure.

Although the lower mixing blades 28 are connected directly to the lower ends of the mixing arms 27, the upper mixing blades 29 are carried by auxiliary arms 78 that are clamped to the rearwardly extending generally horizontal portions of the arms 27. As appears in FIGS. 6 and 8, the auxiliary arms 78 are in the form of twisted flat bars and each is provided with a U-bolt clamp 79 at the upper end which fits over the round bar constituting the mixing arm 27. In this manner the arm 78 is made adjustable on the bar 27 both longitudinally and angularly in order that the upper mixing blade 29 on its lower end may be set in optimum position as required relative to the corresponding lower mixing blade 28 after which the arm 78 is clamped rigidly in adjusted position by tightening the clamp 79. When the proper adjustment has been effected with respect to each of the upper blades 29, for the particular material being mixed, their associated clamps may be welded to the arms 27 to prevent displacement under the strains of the mixing action.

Both the main mixing arms 27 and the auxiliary arms 78 are provided at their lower ends with blade supporting cross pieces or wings 81 that are secured to the arms rigidly by welding or the like. As best seen in FIG. 9, the lower mixing blade 28 for example, being plow-like in shape, presents a curved mixing face 82 on its forward side. On its opposite or rearward side the blade 28 presents an attachment pocket or socket 83 shaped to receive the cross piece 81 on the lower end of the arm 27. When the mixing rotor 31 is rotating in the process of mixing ingredients, the cross piece or wing 81 is forced by the arm 27 against the rearward side of the blade 28 within the socket 83 in order to force the mixing face 82 of the blade forwardly against the ingredients encountered by the blade to displace and mix them. Accordingly, the major mixing forces generally are transmitted directly from the arm 27 through the cross piece 81 and the body of the blade 28 to the material engaged by the mixing face 82. Under these conditions the blade 28 would be held on the arm 27 even without the aid of any fastening means so long as normal mixing continued, the mixing forces being transmitted from the arm to the blade quite independently of any blade holding means.

In order that the blade may remain in place when discharging for instance, a novel and improved arrangement is provided, for retaining the blade 28 on the arm 27 in a manner that permits ready removal when worn. To this end each blade 28 has on its rearward side two pairs of spaced lugs 84 that project rearward in straddling relationship with the respective ends of the cross piece 81.

The lugs 84 of each pair are provided with vertically aligned round holes 85 and are adapted to receive loosely a straight sided retaining pin 86, the two pins 86 when positioned in the pairs of vertically disposed holes 85 serving to prevent removal of the blade from the cross piece 81. As shown in FIG. 9, the pins 86 extend vertically just behind the respective end portions of the cross piece 81 and each pin is provided with two transverse key holes 87 positioned just inwardly of the respective lugs 84 of each pair. Cotter pin keys 88 or the like secured in the key holes 87 serve as temporary restraining means to prevent the pins 86 from moving out of blade retaining position during operation of the mixer.

When the mixer is operated in mixing material of an adherent nature such as the ingredients of concrete, some of the ingredients adhere to the mixing blade and the supporting arm and build up within the socket 83 about the cross piece 81, the lugs 84 and the vertical pins 86 thereby locking the pins securely in blade retaining position and seating the cross piece 81 firmly within the socket 83 where it is protected from wear. After this accumulation of adherent material about the blade fastening means has set, the blade 28 is as securely attached to the arm 27 as though it had been fastened initially by tightening screw threaded bolts and nuts or the like.

The previously mentioned discharge door 40 and the complementary discharge opening 41 that it controls in the floor 22 of the pan 20 have the general shape of an isosceles trapezoid. As best shown in FIGS. 3 and 5 of the drawing, the trapezoidal discharge opening 41 is disposed in the pan floor 22 with its narrow end downstream of the mixing direction and skewed or slanted outwardly somewhat to bring one equilateral side thereof into substantially chordal relationship with the outer wall 23 of the pan 20. At its wider upstream end the discharge opening 41 is of such width that it extends substantially across the mixing chamber 25 with its inner upstream corner closely adjacent to the inner cylindrical wall 24.

After the batch of material within the pan 20 has been thoroughly mixed, the door 40 is opened by withdrawing it endwise beneath the floor 22 of the pan 20. The mixed material above the opening 41 and adjacent to it then immediately falls by gravity through the opening into the discharge chute 42 whereupon the advancing mixing blades push additional material forward into the discharge opening. The length of the opening 41 and its orientation is such that the material being discharged has opportunity to drop through it before the blades can carry the material across to the other side of the opening. In this connection, the material near the outer wall which is moved by the blades at the fastest lineal speed, moves into the longest part of the discharge opening 41 and therefore has the most favorable area for discharging.

The lower mixing blades 28 are of plow-shape with pointed noses that operate close to the floor 22 and from which the curved mixing faces 82 are inclined upwardly and rearwardly. To facilitate discharging the final portion of the mixed material, each blade 28 is provided with an upstanding vertical fin 114 that extends from the leading nose end rearwardly along the back edge of the upwardly inclined mixing face 82, as best shown in FIGS. 9 and 10. When the greater part of the mixed batch has been discharged through the opening 41, the lower blades operate as scoops to gather and push the remaining material along the floor and into the discharge opening. During this final discharging operation, the upstanding fin 114 of each blade slices through the material on the pan floor 22 in manner to prevent the material from scattering by flowing over the point and the forward end of the blade to the rear side of the blade. This causes the final portions of the material to be gathered and urged forwardly by each blade and laterally into the path of a following blade that likewise urges it toward the discharge opening.

The fin of the outermost blade 28 acts as a scraper to remove whatever material may adhere to the outer wall while the fin of the innermost blade 28 scrapes material from the inner wall and in addition operates to divert it into the inner corner of the discharge opening 41 during discharging. In this manner substantially all of the last portions of the mixed material is moved expeditiously around the pan 20 and into the opening 41 thereby effecting discharge of the entire batch rapidly and completely to empty the pan for receiving a new batch of ingredients with least delay. If, on the other hand, it is desired to effect a reduced rate of discharge of the mixed material, to accommodate the rate of charging of a receiving vehicle such as a truck mixer, for example, the discharge opening 41 may be opened only partially as indicated in FIG. 3, the rate of discharge being determined by the degree of opening of the door.

As appears in the drawing, the door 40 is constituted primarily by a renewable door plate 116 the downstream end of which is in the shape of an isosceles trapezoid and is generally complementary in shape and size to the discharge opening 41 although the door plate 116 is somewhat longer than the opening. The renewable door plate 116 is of wear resisting material adapted to withstand the abrasive action resulting from mixing concrete or the like in the chamber 25. Likewise renewable linear plates 117 of similar wear resisting material are applied to the upper surface of the pan floor 22 and to the inner surfaces of the outer wall 23 and the inner wall 24. Any of these plates may be removed when worn and replaced by new plates.

By having the door 40 and the opening 41 of complementary tapered shape, the door may be closed tightly by wedging it endwise into the tapered opening. This is effected by mounting the door for endwise sliding movement at a slight upward angle of inclination to the pan floor 22 whereby when the door is closed the downstream narrow end of the door plate 116 extends upward flush with the renewable wear plate 117 of the pan floor while the wider upstream end of the door plate is inclined downward and lies beneath the floor. Even though the door 40 is snugly wedged in the tapered opening 41, it can be opened readily by withdrawing it endwise beneath the floor 22 since the engaging tapered edges draw apart at once and do not rub upon each other to bind and stick.

The floor 22 of the pan 20 is reinforced about the edges of the discharge opening 41 to compensate for the weakening effect resulting from cutting away the floor structure to form the opening. As shown in FIGS. 11 to 15, relatively deep depending flanges 119 are secured to the underside of the floor 22 along and close to the two equilateral sides of the opening 41. A channel member 121 extends transversely along the underside of the floor 22 close to the narrow downstream end of the opening 41 and also in the area at the upstream end, which is occupied by the door when retracted, the floor is constituted by an extra thick plate 122. The flanges 119 and the channel member 121 not only reinforce the floor but also constitute a shielding baffle that directs the discharged material into the chute 42.

Inwardly of the flanges 119 along the equilateral edges of the opening 41 sealing bars 124 are provided beneath the floor to constitute thickened parts of the floor structure for engaging and sealing the inclined tapered edges of the door 40. Since the door 40 is inclined at a slight angle, the horizontal sealing bars 124 are necessarily thicker than the floor plates and underlie them to provide the required contact area throughout the length of the door. The bars 124 are slotted to receive fastening screws 125 whereby they may be adjusted inward or outward properly to engage and seal against the part of the inclined door edge that extends below the level of the floor plates.

Along its narrow downstream end the discharge opening 41 is provided with a sealing lip 126 that is secured to the transverse channel 121 and that extends inwardly and is curved downwardly to engage with the bottom of the narrow end of the door plate 116 in sealing relationship when the door is closed while holding the upper surface of the door plate 116 substantially flush with the upper surface of the liner plate 117 on the floor 22. Thus when the door is closed its narrow downstream end rides up on the sealing lip 126 but does not quite abut the floor plate 117 as its tapered sides come into wedging engagement with the side sealing bars 124.

Figure 11:
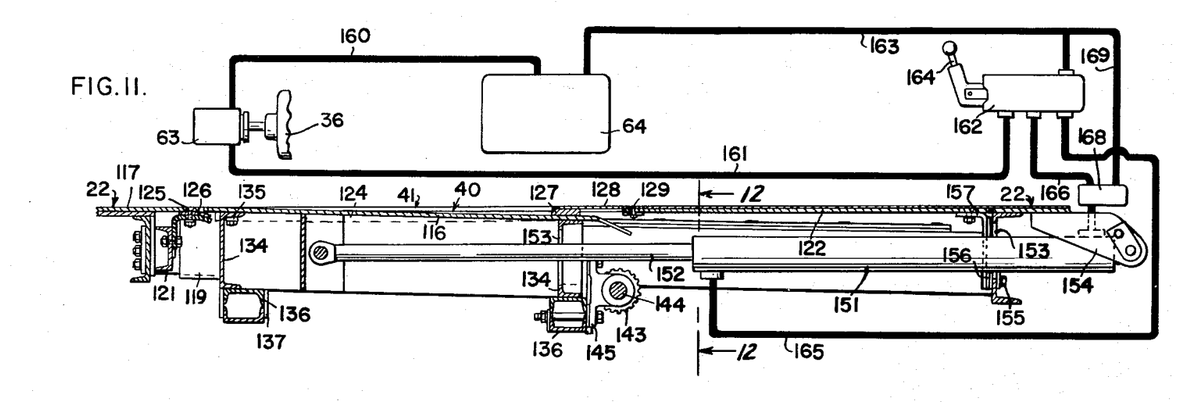
FIG. 11 is a fragmentary view in longitudinal section through the discharge door taken on the plane represented by the line 11—11 in FIG. 3 and showing in addition the hydraulic actuating mechanism for the door.

As appears in FIG. 11, the door plate 116 is somewhat longer than the discharge opening 41, its upstream depressed end having parallel sides and being turned downward at its extreme end beneath the floor 22. While the downstream end of the inclined door 40 is flush with the floor 22, the upstream end slants slightly downward and extends in overlapping relationship underneath the floor. Sealing at this underlying end of the door is effected by means of a hardened lip bar 127 that bears upon the top of the door plate 46 and that is carried beneath the distal end of a flexible plate 128 which is mounted flush with the liner 117 of the floor 22 and is prestressed to urge the lip 127 downward into sealing engagement with the upper surface of the door plate 116. The flexible plate 128 is secured at its upstream end to the thick plate 122 constituting that part of the floor 22 by means of bolts 129 and is disposed flush with the renewable liner plates 117 that cover and protect the surface of the floor 22. As previously mentioned, the liner plates 117 and the door plate 116 may be removed when worn and replaced by new plates. In the same manner, the sealing lip 126, the wedge bars 124 and the flexible plate 128 with its sealing lip bar 127 are all readily renewable when worn.

Figure 14:
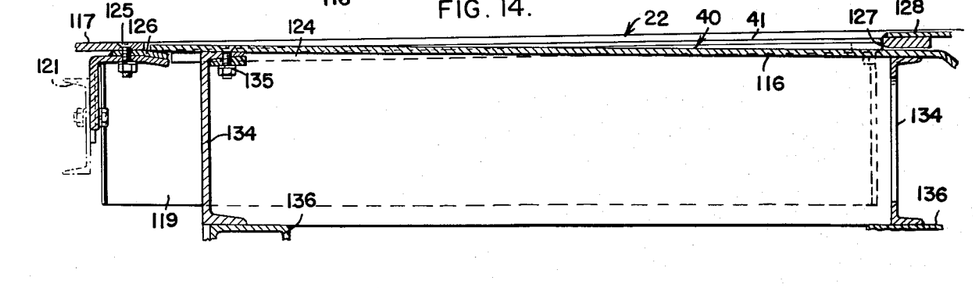
FIG. 14 is an enlarged view in longitudinal section through the door taken on the plane represented by the line 14—14 in FIG. 13.

The door sealing arrangement provided by this invention does not depend upon pliable sealing materials that wear out quickly in use but relies entirely upon metal-to-metal sealing having long operating life. The sealing action is through wedging contact and without straight on abutting contact or long sliding rectilinear contacts which might jam. Furthermore, the engaging sealing surfaces are self-cleaning and do not present steps, grooves or pockets to accumulate material and cause binding. With the door 40 mounted slightly inclined as shown in FIGS. 11 and 14, the door can be opened by withdrawing it endwise beneath the upstream edge of the discharge opening 41 and yet can be closed with the downstream end flush with the pan floor liner 117. By this arrangement, the blades 28 in travelling over the door 40 while mixing, sweep the material along the inclined door plate 116 and across the flush downstream end onto the floor liner 117 without meeting with any obstruction to the flow of the material along the floor of the pan. Because of the slight depression resulting from the inclination of the door 40, when the pan is empty and the door closed the small amount of grout material remaining from the preceding batch tends to gather on the door as the blades push it along the floor. This residual grout material flows into any interstices along the joints between the door 40 and its sealing elements at all four sides and seals them against leakage. With the residual grout on the inclined door, the joints are sealed sufficiently to prevent any substantial leakage of water which is normally introduced into the mixing chamber 25 slightly before the dry ingredients for the next batch are fed in through the charging chute 38. When the sand and cement ingredients of the next batch cover the door 40, the sealing effect is increased and the likelihood of leakage is further reduced.

As shown in FIGS. 11 and 14, the door plate 116 is reinforced around its edges by depending flanges 134 that form a door frame and that are secured to the lower side of the plate 116 by means of bolts 135, the arrangement being such that the plate 116 may be removed from the door frame readily for renewal when worn. The depending reinforcing flanges 134 at the upstream and the downstream ends respectively of the door 40 are in the form of transverse channel members which rest upon and are attached to small box beams 136 that constitute the supporting elements which operate to carry the door 40 in its endwise sliding movements. The transverse box beams 136 are both of the same length and carry at their respective outer ends upstanding brackets 137. Stub shafts 138 project inwardly from the upper ends of each of the four brackets 137 and carry at their inner ends door supporting rollers 139 mounted on anti-friction bearings 140 are movably supporting the door 40 at its four corners.

Figure 12:
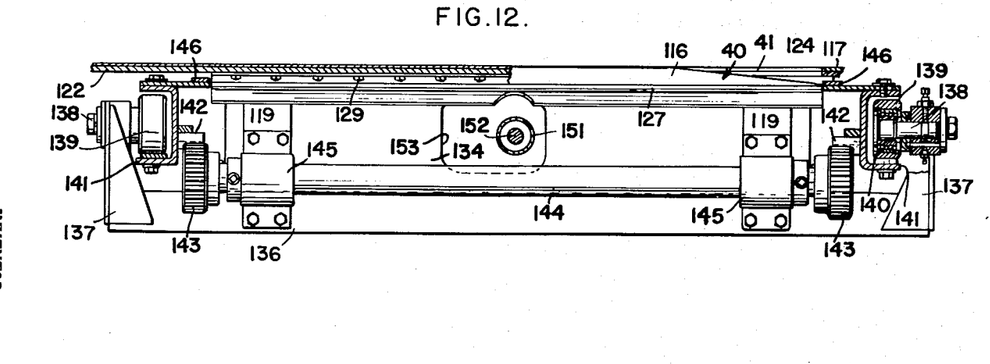
FIG. 12 is a view in transverse section through the door mechanism taken on the plane represented by the line 12—12 in FIG. 11.
Figures 13, 15:
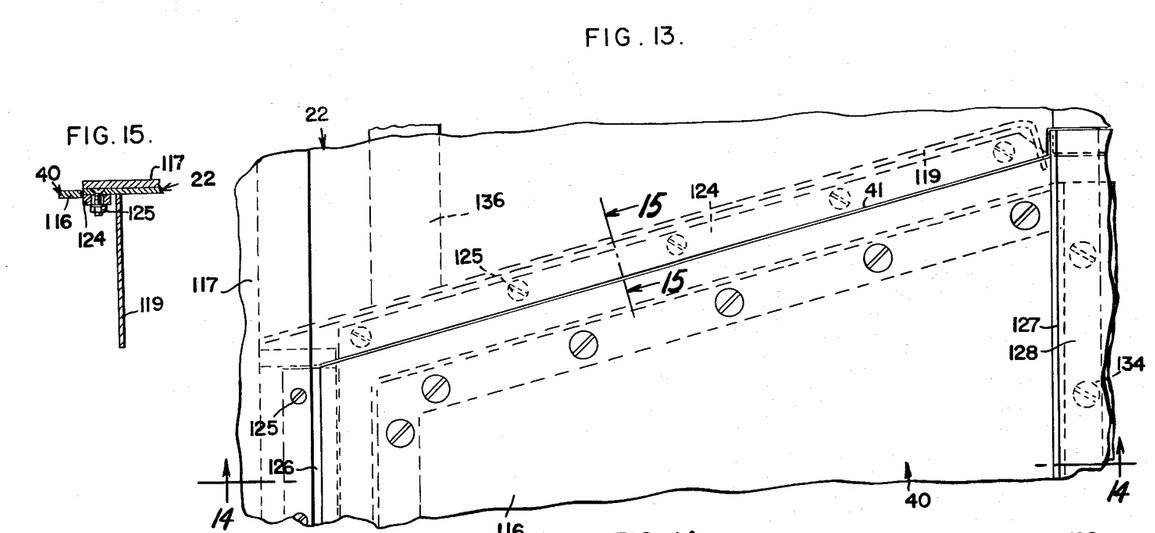
FIG. 13 is an enlarged fragmentary plan view of one side of the discharge opening and part of the cooperating door.
FIG. 15 is an enlarged detailed view in transverse section taken through the edge of the door and the mating frame on the plane represented by the line 15—15 in FIG. 13.

As best seen in FIG. 12, the inwardly projecting rollers 139 fit in trackways 141 formed by a pair of outwardly facing channel members that are secured at the opposite sides of the discharge opening 41 beneath the pan floor 22 and parallel with the direction of movement of the door 40. The two trackway channels 141 are inclined relative to the pan floor 22 at the angle of inclination of the door 40 relative to the opening 41. The trackways 141 are of sufficient length to provide for inclined endwise movement of the door along a straight line path between its open and its closed positions as the rollers 139 roll along renewable liner strips on their lower flanges.

The upper flanges of the channels 141 are in closely spaced relationship with the upper sides of the rollers 139 and operate to prevent excessive upward movement of the door 40, particularly at its downstream end when it rides up on the sealing lip 126 in closing. In order to prevent the door 40 from skewing and binding in its movements and to maintain it in transverse operating alignment with the discharge opening 41, each of the trackway channels 141 is provided on its inner side with an inverted toothed rack 142. The two racks 142 are in meshing engagement respectively with toothed pinions 143 fixed on the respective ends of a transverse shaft 144 that is journalled in spaced bearings 145 attached to the transverse beam 136 beneath the upstream end of the door 40. By operation of the inter-connected pinions 143 along the racks 142 both sides of the door 40 are constrained to move together and neither side can get ahead of the other, which action might otherwise cause binding of the rollers 139 within the trackways 141 and other difficulties.

As previously mentioned, the upstream end of the door plate 116 that extends beneath the floor 22 when the door is in closed position is provided with parallel sides. These parallel sides cooperate respectively with adjustable parallel guide plates 146 that are secured to the tops of the respective track channels 141, as shown in FIG. 12. When the door 40 is opened, the parallel guide plates 146 serve to maintain it in a generally central position relative to the discharge opening 41. The guide plates 146 are adjusted to provide a loose fit with the door in order to permit sufficient lateral movement during closing to insure that the tapered sides of the door plate 116 are free to move into proper wedging engagement with the sealing bars 124 at the sides of the discharge opening 41. In addition to serving as a guide member, the extended upstream end of the door plate 116 is provided with a down-turned edge that projects over and operates as a shield for the pinions 143 and their shaft bearings 145 to protect them from grout material or wash water that might drip from the door when not tightly sealed.

Opening and closing movements of the door 40 are effected by power preferably through operation of a hydraulic cylinder 151 mounted beneath the floor 22 at the upstream end of the discharge opening 41, although it is to be understood that other power means such as an air cylinder may be used. As shown in FIG. 11, the cylinder 151 is provided with a piston rod 152 that projects forwardly from the cylinder through a relatively large opening 153 in the depending flange 134 at the upstream end of the frame of the door 40 and is pivotally connected at its forward end to brackets on the flange 134 depending from the downstream end of the door.

The cylinder 151 is pivotally connected at its closed upstream end to a bracket 154 that is in turn connected by bolts 155 and shims 156 to an angle member 157 that is secured to and depends from the bottom of the pan floor 22. When the door 40 is closed as shown in FIG. 11 the piston rod 152 is fully extended from within the cylinder 151. As wear takes place between the sides of the door plate 116 and the side sealing bars 124 and between the downstream end of the door plate and the sealing lip 126 any leakage that may occur can be corrected by causing the door to advance a little farther downstream in closing. This can be accomplished readily by removing the bolts 155 that secure the cylinder supporting bracket 154 and reducing the thickness of the shims 156 by the proper amount. When the bolts 155 are replaced and tightened, the bracket 154 and the cylinder 151 will be moved sufficiently in the downstream direction to restore the door plate 116 to tightly fitting relationship both with the sealing lip 126 and the side sealing bars 124.

Hydraulic fluid under pressure for actuating the piston-rod 152 in the hydraulic cylinder 151 is derived from the previously mentioned hydraulic pump 63 that is driven by the motor 36 on the main frame 21 as shown in FIGS. 1 and 4. The pump 63 is indicated diagrammatically in FIG. 11 as connected to withdraw hydraulic fluid from the reservoir 64 through a conduit 160 and to deliver it under pressure through a pressure conduit 161 to a three-way control valve 162. From the control valve 162 a return conduit 163 returns exhaust fluid to the reservoir 64 in the usual well known manner. The control valve 162 is provided with an operating handle 164 by means of which it may be operated manually or power actuated means may be provided alternatively for shifting the valve by remote control. The valve 162 is so arranged internally in a well known manner that when the control handle 164 is in its central neutral position as shown in the drawing, the fluid delivered from the pump 63 through the conduit 161 will be bypassed within the valve into the return conduit 163 and circulated at low pressure back to the reservoir 64. Furthermore the valve 162 is provided internally with a pressure limiting relief valve that may be adjusted to permit the escape of excess fluid into the return conduit 163 should the pressure in the pressure conduit 161 exceed a selected maximum.

When it is desired to open the door 40, for example, the control handle 164 is moved from the central neutral position toward the right as seen in the drawing thereby closing off the connection between the pressure conduit 161 and the return conduit 163. At the same time a connection is established between the pressure conduit 161 and a conduit 165 leading to the rod end of the hydraulic cylinder 151. Also a conduit 166 leading from the closed end of the cylinder 151 is connected through the valve 162 to the return conduit 163. Pressure fluid thus admitted to the rod end of the hydraulic cylinder 151 causes the piston rod 152 to be moved toward the right thereby retracting the attached door 40 toward open position. Fluid in the closed end of the cylinder 151 escapes through the conduit 166, the valve 162 and the return conduit 163 to the reservoir 64.

If it is desired to open the door 40 only partially to limit the rate of discharge, the control handle 164 is returned to its central neutral position when the door is sufficiently opened. The valve 162 then operates to bypass pressure fluid from the conduit 161 into the return conduit 163 and to close off both of the conduits 165 and 166 to trap fluid in the cylinder 151 for retaining the piston 152 and the door 40 in the selected partially open position.

When it is desired to close the door 40, the control handle 164 is moved to the left from its neutral position thereby closing off the connection between the pressure conduit 161 and the return conduit 163. The pressure conduit 161 is then connected with the conduit 166 leading to the closed end of the cylinder 151 while the conduit 165 leading from the rod end of the cylinder 151 is connected to the return conduit 163. Since the door 40 moves substantially horizontally in closing, when the pressure fluid is admitted to the closed end of the cylinder 151 the door can be closed readily against the downward flow of the material being discharged to decrease the rate of flow as desired or to shut off the flow entirely. If the door should fail to close entirely because of some hard object such as a stone becoming lodged between the door and an edge of the opening 41, the object can be dislodged readily merely by reversing the door movement momentarily through operation of the control handle 164. In situations where the door 40 cannot be observed readily, an indicator such as a pilot light may be provided to indicate when the door is fully closed.

In order to avoid damage to the door 40 or to its cooperating sealing surfaces by objects that may be caught between them, the closing force exerted upon the door by the piston rod 152 may be limited as desired by means of an adjustable auxiliary pressure relief valve 168 that is provided in the conduit 166 leading to the closed end of the cylinder 151. In practice the auxiliary relief valve 168 has ordinarily been set to relieve pressure higher than about seven hundred fifty pounds per square inch. When the door closing pressure exceeds the amount for which the valve 168 is set the excess fluid escapes through the valve 168 into a conduit 169 that leads to the return conduit 163. The previously mentioned internal pressure relief valve within the control valve 162 has ordinarily been set to relieve pressure higher than about twelve hundred pounds per square inch to limit the door opening pressure within the rod end of the cylinder 151.

Although a specific example of the improved pan type mixer has been set forth in detail by way of a full disclosure of a practical and useful embodiment of the invention, it is to be understood that other arrangements of the improved features disclosed herein may be incorporated in apparatus of different construction by those familiar with the art of mixing the ingredients of concrete and similar materials without departing from the spirit and scope of the invention as defined in the subjoined claims.

The novel features of this invention having now been fully set forth and explained, I claim as my invention:

1. In a mixer of the pan type for mixing concrete and the like, a power driven mixing rotor disposed to rotate upon a vertical axis, mixing blades carried by and depending from said mixing rotor for rotation therewith in a predetermined mixing direction, a circular mixing pan disposed in cooperating concentric relationship with said mixing blade, said pan having an outer cylindrical wall and an inner cylindrical wall spaced inwardly therefrom and both upstanding from a horizontally disposed floor to constitute therewith an annular mixing chamber for receiving the ingredients of concrete to be mixed by said blades, said floor presenting a discharge opening of generally isosceles trapezoidal shape disposed with its narrow end downstream of the predetermined mixing direction and with one side in generally chordal relationship with said outer cylindrical wall, a door for closing said discharge opening said door being of generally complementary isosceles trapezoidal shape, and means to mount said door for generally tangential endwise sliding movement inclined upwardly in the downstream direction in manner to wedge it into said discharge opening to close said opening during mixing of the ingredients, the arrangement being such that said door may be withdrawn readily from wedging relationship with said discharge opening by retracting it endwise beneath said floor in the upstream direction to a predetermined extent thereby to open said discharge opening selectively either partially or fully for the discharge of mixed concrete at a desired rate as it is swept into said discharge opening by said revolving mixing blades.

2. A mixer for mixing concrete and the like including a pan having a floor and concentric side walls defining a circular mixing chamber, a rotor having mixing blades moving in one direction over said floor in said chamber, said pan including structural members defining two parallel and two non-parallel vertical sides defining an opening in the floor thereof for the discharge of concrete, one of said non-parallel vertical sides being adjacent to the outer of said walls, the longer of said parallel sides extending across the mixing chamber and defining a lip over which the concrete is discharged as it moves with said blades, the member defining the shorter parallel side constituting a shelf which is offset downwardly of the floor of the pan, a plate having one end in slideable engagement with said shelf and having edges abutting the non-parallel vertical sides of said opening and having a wider end extending beneath and in slideable engagement with the underside of said member defining the longer parallel side of said opening, said plate being angularly disposed with respect to said floor and having guide and power-operated means for effecting rectilinear endwise opening and closing movement thereof whereby said plate operates as a door to control the discharge of concrete through said opening.

3. The apparatus of claim 2 wherein a clearance provided the narrower end of the plate resting on said shelf allows the closed position of the plate to shift in the direction in which the vertical sides converge to take up wearing of the edges of the plate and the members defining said converging vertical sides.

4. The apparatus of claim 2 wherein the corners defined by the top of the plate and by the non-parallel sides of said members extending above the plate in the closed position diminish and converge in the direction of movement of the concrete mix over the floor of the mixer whereby said corners are adapted to be sealed by the finer material or grout of the concrete mix.

5. The apparatus of claim 2 which includes means biasing the member defining the longer parallel side and the plate in slideable engagement to maintain a seal therebetween in all positions of the door and to prevent aggregate of the concrete mix from lodging therebetween and binding the door.

6. The apparatus of claim 5 wherein the narrower end of the plate and the edges of the plate are respectively moved in directions away from the shelf and non-parallel vertical sides by said means upon opening movement of the door so that the seals referred to are immediately broken upon such movement and a controlled discharge opening is provided which extend substantially across the floor of the mixer.

7. In a mixer of the pan type for mixing concrete and the like, a mixing rotor arranged for rotation about a vertical axis, power operated means connected to said rotor to drive it in a predetermined mixing direction, mixing blades on said rotor arranged to mix and to move concrete in the predetermined mixing direction, a circular mixing pan constituting a mixing chamber for concrete being mixed and disposed in concentric cooperating relationship with said mixing blades on said rotor, said pan having a cylindrical outer wall upstanding from a flat floor having therein a discharge opening in the general shape of an isosceles trapezoid disposed with its narrow end downstream of the direction of movement of concrete being mixed and with one of its sides adjacent to said outer wall, the arrangement being such that said mixing blades may operate to discharge concrete through said opening as they turn in the mixing direction, a closure door for said discharge opening of shape complementary to said opening or somewhat longer, means to mount said door for lengthwise sliding movement along a path slightly inclined to said pan floor from an open position beneath and in sliding relationship with said pan floor adjacent to the upstream wide end of said discharge opening to an upwardly inclined closed position with its tapering sides in wedging engagement with the complementary sides of said opening and with its narrow end contacting the narrow end of said opening, and means to move said door from its closed position to any selected intermediate position by withdrawing it lengthwise a predetermined amount beneath said pan floor thereby to control the rate of discharging of the concrete through said discharge opening.

References Cited by the Examiner
UNITED STATES PATENTS

| | | | |
|---|---|---|---|
| 702,881 | 6/1902 | Otis | 259—178 |
| 2,577,010 | 12/1951 | French | 259—24 |
| 2,953,359 | 9/1960 | Mau | 259—23 X |

IRVING BUNEVICH, *Primary Examiner.*